(12) United States Patent
Groitzsch et al.

(10) Patent No.: US 8,452,524 B2
(45) Date of Patent: May 28, 2013

(54) METHOD AND DEVICE FOR IDENTIFYING TRAFFIC-RELEVANT INFORMATION

(75) Inventors: Stephan Groitzsch, Weinheim (DE); Matthias Schorn, Mühltal (DE)

(73) Assignees: Continental Teves AG & Co. oHG (DE); Continental Engineering Services GmbH (DE)

( * ) Notice: Subject to any disclaimer, the term of this patent is extended or adjusted under 35 U.S.C. 154(b) by 687 days.

(21) Appl. No.: 12/601,416

(22) PCT Filed: May 16, 2008

(86) PCT No.: PCT/EP2008/056041
§ 371 (c)(1),
(2), (4) Date: Apr. 1, 2010

(87) PCT Pub. No.: WO2008/145545
PCT Pub. Date: Dec. 4, 2008

(65) Prior Publication Data
US 2010/0198488 A1     Aug. 5, 2010

(30) Foreign Application Priority Data
May 25, 2007   (DE) .......................... 10 2007 024 695

(51) Int. Cl.
*G01C 21/26* (2006.01)
(52) U.S. Cl.
USPC ............................ 701/117; 701/118; 701/119
(58) Field of Classification Search
USPC .......... 701/117–119, 409–414, 423; 382/100, 382/103, 104
See application file for complete search history.

(56) References Cited

U.S. PATENT DOCUMENTS

| 6,560,529 | B1 | 5/2003 | Janssen | |
|---|---|---|---|---|
| 6,801,638 | B1 | 10/2004 | Janssen et al. | |
| 8,155,826 | B2* | 4/2012 | Nakamura et al. | 701/517 |
| 8,184,861 | B2* | 5/2012 | Nakamura et al. | 382/104 |
| 8,213,682 | B2* | 7/2012 | Nakamura et al. | 382/104 |
| 2001/0051850 | A1 | 12/2001 | Wietzke et al. | |
| 2004/0215377 | A1 | 10/2004 | Yun | |

FOREIGN PATENT DOCUMENTS

| DE | 19842176 A1 | 3/2000 |
|---|---|---|
| DE | 19938261 A1 | 2/2001 |
| DE | 19938266 A1 | 2/2001 |
| DE | 19938267 A1 | 2/2001 |
| DE | 10007813 A1 | 9/2001 |
| DE | 10254806 A1 | 6/2004 |
| DE | 10354910 A1 | 11/2004 |
| EP | 1145186 A2 | 10/2001 |
| EP | 1114371 B1 | 4/2003 |
| EP | 1503354 A1 | 2/2005 |

* cited by examiner

*Primary Examiner* — Richard M. Camby
(74) *Attorney, Agent, or Firm* — RatnerPrestoa (57) ABSTRACT

A method is presented for recognizing traffic-related information (I) in a driving motor vehicle, in which sensor data (B) from a sensor and map data (K) from a navigation system are interpreted for recognition purposes, wherein the sensor data (B) is inspected in a first scene interpretation for the presence of traffic-related information (I) and is compacted to relevant sensor data ($B_r$), the map data (K) is inspected in a second scene interpretation for the presence of traffic-related information (I) and is compacted to relevant map data ($K_r$), and the relevant sensor data ($B_r$) and relevant map data ($K_r$) is fed to a regulator for interpreting the sensor and map data, wherein the regulator evaluates the sensor data ($B_r$) and the map data ($K_r$) and then issues an output signal which corresponds to the evaluation.

29 Claims, 3 Drawing Sheets

METHOD AND DEVICE FOR IDENTIFYING TRAFFIC-RELEVANT INFORMATION

CROSS REFERENCE TO RELATED APPLICATIONS

This application is the U.S. national phase application of PCT International Application No. PCT/EP2008/056041, filed May 16, 2008, which claims priority to German Patent Application No. DE102007024695.3, filed May 25, 2007, the content of such applications being incorporated by reference herein.

FIELD OF THE INVENTION

The invention relates to a method, a device and a system for recognising traffic-related information in a driving motor vehicle, and a motor vehicle with such a system, a programme element and a medium which can be read by a computer.

BACKGROUND OF THE INVENTION

Traffic-related information can in particular be traffic signs which for example indicate the highest permitted speed. Alongside explicit traffic signs, the invention relates however to all information which can be received, visual or otherwise such as via radio, and which specifies a certain manner of driving, such as a speed which must be observed. It is provided that the image data of a visual sensor, in particular of a visual camera which is pointed in the driving direction, and the card data of a navigation system, are respectively pre-evaluated for recognition purposes, and the results of the pre-evaluation are compiled and interpreted.

Many developments in modern motor vehicles serve to draw the attention of the driver to traffic-related information in order to make driving safer overall. This includes in particular information regarding the current valid maximum speed, which alongside purely auxiliary information for the driver can also be used to generate warning messages or for direct interference in the speed of the motor vehicle by braking or accelerating.

For many years, navigation systems have been known in which alongside the course of the road and road type, a speed limit which is relevant in each case is also entered. The quality of this speed limit, which is firmly entered into the road maps, depends to a significant degree on the completeness and current relevance of the digitalised maps, however. After a speed limit has been changed, experience has shown that it takes a long period of time until new speed information is entered into the digital maps. A far greater problem is that the digital road maps are frequently stored in the navigation systems, and experience has shown that they are relatively infrequently updated by the user, since this entails not insignificant costs.

It is even more difficult with regard to the system to capture temporary information which is provided for example by sign bridges on motorways with information which has been adjusted to the traffic flow and speed limits, or on building sites. It is precisely this temporary information which is of particular relevance to safety, since the speed limits or other rules given to the driver of a motor vehicle in this manner have been adjusted to the current traffic flow or an acute hazard situation. However, this information cannot be captured by the navigation system described above.

For this purpose, DE 199 38 261 A1 recommends that temporary local conditions or personal impressions by the driver which are related to the route be taken into account, in which temporary local conditions which can be entered automatically or manually such as temporary speed limits, traffic jam warnings or similar can be set as variable electronic route markers, which are shown when the route is traveled repeatedly and/or have a regulatory influence on the automatically regulated operation of the motor vehicle. The particular problem here, however, is that this information is usually available only when the route is traveled again, and cannot be retrieved precisely in situations when the driver is travelling an unknown route for the first time.

DE 199 38 267 A1 recommends a system for the electronic recognition of traffic signs which are captured by means of a video camera, subsequently interpreted and displayed inside the motor vehicle. The recognised traffic signs should be stored in a navigable, electronic route map in relation to the location in order to improve the quality of the digital map and to enable improved correlation of traffic signs with navigable route data. As a supplement, it is recommended by DE 199 38 266 A1 for this purpose that when there is no doubt-free recognition of a traffic sign or of one of several traffic signs, a logical consideration be automatically made of such a type that further traffic flow parameters and/or traffic signs are included in the interpretation, and that as a result, the most minimal speed limit possible is calculated. This data is stored in correlation with the location, wherein the driver is given the option of correcting it.

DE 103 54 910 A1 discloses an autonomous motor vehicle which is equipped with a self-controlling navigation system and which monitors traffic signs which are set up on the edge of the road. For this purpose, a camera records traffic signs which are set up along the motorway. An image processor analyses these images and calculates the symbol content contained in the traffic signs. At the same time, map information regarding the motorway is stored in a navigation database. An electronic control unit with artificial intelligence now calculates a present position of the independently driven motor vehicle and a road condition on the basis of the map information stored in the navigation database and the symbol content read by the image processor. Building on the result of the calculations, a processor then controls a steering operation, a speed reduction/increase operation and an operation which is connected to the self-control navigation operation. This system is initially restricted to motorways, however, since there, the symbols used are limited and an interpretation and recognition of these symbols is far easier than on many other roads, in particular in towns and cities where the signs are frequently unclear.

EP 1 114 371 B1 describes a method and a device for recognising traffic signs and navigation. When traffic signs are recognised, traffic sign recognition data is created and navigation data provided for the purpose of localising the motor vehicle, wherein the traffic sign recognition data and the navigation data is mutually adjusted and if necessary updated. For this purpose, this data is fed to a shared evaluation unit which calculates a currently valid speed limit and if necessary, generates control signals.

All the systems described above have the problem, however, that the data gained as a result of image data recognition is very comprehensive and the data processing described frequently cannot be conducted in real time, at least when all image data is evaluated accordingly.

For this reason, EP 1 145 186 B1 recommends a system with at least one map-based navigation system and a system for displaying content by means of traffic signs which are recorded by a camera, in which the system for recognising traffic signs starts to operate with increased capacity when on the basis of map-based information, it is realised that the motor vehicle is passing an area which is problematic with regard to the recognition of traffic signs. For this purpose, a multi-processor system is used for the utilisation of free data capacity in the entire motor vehicle. Here, however, the problem is that the increased computing capacity is only provided when information is only present for the fundamental map-based system regarding the fact that a situation could arise which is possibly difficult to evaluate for the image capturing.

SUMMARY OF THE INVENTION

An object of the invention is to recommend a possibility of recognising traffic-related information on the basis of sensor data from an e.g. visual sensor and map data from a navigation system, which subjects the recognised sensor data and the recognised map data to a joint analysis, which is easy to adapt and which provides fast, reliable information. For example, the system recommended should provide information regarding the current permitted speed limit.

With the method for recognising traffic-related information of the type described in the introduction, it is in particular provided that the sensor data is inspected in a first scene interpretation after the traffic-related information is received, and is compacted to the relevant sensor data.

It should be noted that the sensor can be a visual sensor, such as a camera. The sensor can also, however, be designed as a radar or lidar sensor, or e.g. as a radio receiver or in RFID technology, which receives radio signals from the actively transmitting traffic signs. A system is also feasible which in a similar manner to TMC transmits the permitted maximum speeds for route sections, so that it is not absolutely necessary for each individual traffic sign to have a transmitter; instead, the information with regard to the traffic signs can be transmitted from one central transmitter.

The raw sensor data is processed in the preliminary treatment process 7 with e.g. an image processing method such as edge detection, circle detection, tracking, or classification with the aid of a trained classifier. This results in traffic signs which are then detected and assigned to a category. These are in turn compacted to the relevant information in the scene interpretation sensor data 10 (i.e. scene interpretation image data 10, for example), as a sub-block of the fusion module 2. The traffic-related information can here be certain traffic signs, in particular traffic signs which limit the speed, road markings, obstacles or similar, which affect the driving behaviour and in particular, the permitted or appropriate maximum speed.

Furthermore, the map information is inspected in a second scene interpretation for traffic-related information received, and is also compacted to relevant map information. The traffic-related information of the map data can for example be information entered in the map material related to speed limits, an overtaking ban or other current information from a telematic system such as accidents, obstacles, building sites or similar. Information regarding topological conditions, such as the area surrounding a road exit, roundabouts and information regarding the road section currently being traveled such as road classification, number of lanes, road route within and outside urban areas, right or left-hand drive and country are included here.

If necessary, the first and second scene interpretation can also exchanged certain information in order to rectify lack of clarity when recognising traffic-related information in the scene interpretations (such as image data) or the map data on the basis of the other data available, and to be able to conduct effective data compaction (image compaction). The compacted (image) information can for example be issued as vectors in a defined data format.

The sensor and map data which is recognised as being relevant and which has been compacted is then fed to a regulator and a finite state machine in order to interpret the sensor and map data, wherein the regulator evaluates the sensor and map data and forwards an action to be implemented to the finite state machine. The finite state machine, on the basis of the action to be implemented which is specified to it by the regulator, implements a transition between pre-defined states and issues information which is assigned to the transition or to the (new) state which is achieved as a result of the transition.

According to aspects of the invention, states are defined in the finite state machine which characterise the properties of the driving motor vehicle and, if necessary, of the surrounding environment. Information of this type includes for example the speed of the motor vehicle, the response of safety-related sensors such as the yaw rates, the acceleration or delay data, information regarding the type and the state of the road, status information on the visual sensor and/or the map material, in particular its age, and/or similar. According to aspects of the invention, data from the sensor cluster of an EPS system is accessed. The combinations of motor vehicle or surrounding environment properties which are to be taken into account by the system according to aspects of the invention are pre-defined as states of the state space, and characterise—in particular when detached from an interpretation of the state which conforms to the rules on the basis of the recognition of traffic-related information—the state in which the driving motor vehicle currently finds itself in its surrounding environment.

The state of the driving motor vehicle can change in the time progression. This occurs for example when the motor vehicle drives out of an area with no speed limit and into a speed limit area, which can in particular be defined by a traffic sign, but also for example by a certain structural situation of the road (dual carriageway with affixed central guard rail) or other factors. As soon as the sensor data from the visual sensor and/or the map data from a navigation system determine the presence of traffic-related information of this type, the compacted information is evaluated in the regulator and the result of this evaluation is sent to the finite state machine as an action to be implemented. The finite state machine evaluates the action of the regulator to be implemented as a transition in its state space, in which starting from the initial state, a change is made into a new end state, or, if necessary, back to the same end state. The transition or the newly created state can be connected, depending of the type of transition, with a certain emission of information which is assigned to the state, such as a warning to the car driver that he has exited a section of the road where no speed limit applies and entered a section which is subject to a speed limit, with the speed limit at 80 km/h.

Depending on the implementation of the system according to aspects of the invention, this information which is issued by the finite state machine can be implemented alongside information given to the drive for direct intervention in the motor vehicle by triggering a braking action, for example, wherein a specification of a speed for a Limiter, a specification of a speed for Adaptive Cruise Control is intended according to aspects of the invention when the motor vehicle drives faster than is shown by the current traffic-related information regarding the maximum speed limit.

The system according to aspects of the invention comprises a modular arrangement in its structure, which makes it possible to modify and adapt the functions of the method according to aspects of the invention and the associated device in a simple manner. Thus for example, new traffic signs or other information can be incorporated in the scene interpretation which is further processed to compacted image or map data which can already be evaluated by the system without further adjustments being necessary in the regulator or finite state machine.

Due to the division of the calculating unit into a regulator which enables the dissolution of contradictory situations into the prepared input data in a manner which conforms to the rules and a finite state machine which defines the state of the motor vehicle and the surrounding environment which is essentially free of a rule interpretation, sets of regulations can also be easily modified and adapted. For example, in this manner it is possible to simply specify sets of rules for different countries, and to subsequently load them into the system in a modular fashion by updating the regulator when a border is crossed. Alternatively, when only one regulator is used, certain rules can be activated/deactivated in a country and it is intended that the regulator be fully replaced for each specific country. A further alternative is the country-specific replacement of rules in the regulator which depend on country-specific standards with regard to the existing legal requirements for road traffic. Changes in the finite state machine are here not usually necessary, since there, the state of the motor vehicle which is generally independent of the rule interpretation is defined.

The individual elements or modules of the system can be structured in as complex a manner as required without altering the modular structure of the overall system. This enables rapid, real time processing even when complex data is recognised. Thus, uncomplicated adaptation to any possible other input sources in the future (such as motor vehicle data of third parties from telematic applications) can be conducted, to which the present invention also relates.

According to aspects of the invention, it is particularly advantageous when in the regulator, the content-related interpretation of the relevant image and map data is conducted on the basis of specific sets of rules, and the action specified by the regulator parameterises behaviour to be observed on the basis of the recognised rule. Thus, the part of the detection of traffic-related information which makes an evaluation of the content of the captured image and/or map data is integrated into a logically independent block, which can be easily adapted when an alteration is specified from outside, for example by altering the capacities of the input signal sources, altering the road traffic rules or driving to another country with different traffic rules. For this purpose, it is advantageous when a transparent regulator which is easy to adapt is selected, among other things in order to enable the simple adaptation to different country variants.

A particularly advantageous design of the regulator which can be used according to aspects of the invention can be achieved by means of a matrix which can be evaluated using an algorithm. This is particularly useful when the relevant image and map data and, if appropriate, further data such as status information regarding the state of the visual sensor or motor vehicle information such as speed, ambient temperature, road condition (wet conditions, snow, black ice), ESP data or similar are present as vector information and are transmitted to the regulator and finite status machine in this form. Due to a suitable matrix operation, a corresponding action can be derived in a mathematically simply form from the recognised image or map data. The regulator is stored in the form of two arrays, although in order to evaluate the rules, no "classic" matrix operations are used.

According to a particularly preferred embodiment, the finite state machine comprises defined states in which the motor vehicle and/or its surrounding environment can (or may) be located, wherein the actions of the regulator to be implemented effect a transition in the finite state machine from one defined state to another defined state, or to itself. Due to the definition according to aspects of the invention of a state space with pre-selected, pre-specified states, a simple, modular system is created in which a conclusion regarding the effects of a rule due to the recognition of traffic-related information can be reached without a high computing capacity, both in order to define a new state of the motor vehicle and/or surrounding environment and to issue information in a display or to a motor vehicle control system.

For this purpose, it is particularly advantageous when each transition is itself connected in the finite state machine with an output of information, such as to a display instrument in the motor vehicle. In this manner, a necessary output of data is particularly quickly achieved when a transition is to be conducted.

Preferably, the finite state machine can also report back its current state to the regulator, so that when interpreting the relevant image or map data, the regulator can also take into account the state of the motor vehicle and/or the surrounding environment. In order to achieve this, the relevant, compacted image data and the relevant, compacted map data can be fed simultaneously to the regulator and finite state machine, so that the current state is reported back by the finite state machine, if necessary while the rules are still being evaluated in the regulator. Insofar as this is required for certain rules, the regulations can also provide, for example, that current information must be present prior to the evaluation of the rules in the regulator.

According to aspects of the invention, the finite state machine can be divided into a main finite state machine which in particular displays the output behaviour of the finite state machine and for example processes the information which characterises the state of the motor vehicle, and one or more surrounding environment finite state machines which display specific, and in particular, temporarily modifiable ambient conditions of the motor vehicle, such as a route section where a building site or temporary traffic signs are present. Due to the division off the finite state machine into several different finite state machines, a parallel processing of several transitions is also possible due to an action to be implemented which is specified by the regulator.

According to a particularly preferred embodiment of the method according to aspects of the invention, during compaction to relevant image or map data, i.e. when traffic-related data is present and recognised, the first and second scene interpretation transmit a trigger signal to a trigger control which then generates an overall trigger signal for the regulator and the finite state machine. The overall trigger signal has the effect that the regulator and the finite state machine process the compacted or relevant image and map data which is present on its internal inputs. After the overall trigger signal has been received, the regulator determines the action to be implemented, and the finite state machine calculates its state from the information present, so that following receipt of the action to be implemented, it can conduct a transition from its initial state into a new state. According to aspects of the invention, the regulator can transmit an additional trigger signal to the finite state machine on completion of its rule interpretation, and if necessary, together with the issue of the action, so that the finite state machine directly conducts the transition.

According to a simple embodiment the trigger control can form a disjunction of the two trigger signals of the first and second scene interpretation in order to generate the overall trigger signal.

A preferred variant of the trigger control provides, however, that when a first trigger signal is present from the first or the second scene interpretation, a counter such as a distance counter which integrates the current motor vehicle speed is activated, and either when a maximum counter value has expired, i.e. in the example, a maximum distance which has been traveled, or when the second trigger signal is present from the second or first scene interpretation, the overall trigger signal is generated. In this manner, the time asynchronicities between different data can be captured and the optimum point in time for evaluating the data can be defined by the regulator and the finite state machine. Preferably, the regulator and the finite state machine can receive the overall trigger signal at the same time, so that the rule evaluation and the state recognised in the finite state machine is based on the same data, and the transition triggered by the action of the regulator also assumes the correct state in the finite state machine. Advantageously, it is intended in a further embodiment that the overall trigger signal GT is generated in such a manner that when the trigger from the pre-processing of the image recognition data is present, the overall trigger signal GT is triggered immediately, and is delayed only when the trigger from the pre-processing of the map information is present.

Advantageously, in the first and/or second scene interpretation, relevant image and/or map data is selected on the basis of specified criteria. For this purpose, relevant image and/or map data which has been captured at different points in time can be set in a time context. The traffic signs or other information which are detected by the sensor at different points in time are thus set in an overall context, and as a result, the point in time is determined, for example, at which a traffic sign is in reality passed by the driving motor vehicle. Furthermore, a local selection of relevant images can be made using the knowledge of the camera or sensor position and the location of the traffic sign on the sensor surface, such as the pixel of a CCD camera, wherein a time and location correlation between the signals permits an even more precise interpretation of the scene. The location and time correlation with data is particularly useful with sign bridges, for example, in which information which is relevant for the road lane is difficult to determine without detection with a local resolution. It is furthermore possible within the scope of map data to generate from the current speed vector of the motor vehicle a preview of the information which is assumed to be of relevance within a short period of time. In this context, it is advantageous when the first and second scene interpretation exchange the already compacted image or map data in particular, so that recognised information from a scene interpretation can be incorporated with the other scene interpretation.

In particular in order that the first and second scene interpretation operate at a comparable speed relative to each other, it can be provided according to aspects of the invention that the image data of the visual sensor be reduced during a treatment stage which is conducted before the scene interpretation to a pre-selection of image data to be inspected and status information (camera status data). The status information can for example display the quality state of the camera (darkness, dirty windscreen or similar). This status information can also be used within the scope of the regulator when the information between the image data and map data deviates, in order to reach a conclusion which is correct for the two sets of data to a higher degree of probability.

As has already been mentioned, the first and the second scene interpretation can according to aspects of the invention exchange information in order to achieve an optimum compaction of the image and map data in every scene interpretation. In particular, the detection of traffic-related information in one scene interpretation should be transmitted directly to the other scene interpretation.

Additionally, it is particularly advantageous when raw motor vehicle data, e.g. motor vehicle sensor data such as ESP, speed or similar and/or camera status data such as brightness, image quality or similar is present overall during the process of detecting traffic-related information, in particular in the scene interpretations, the regulator and/or the finite state machine.

Alongside the method described above, the invention also relates to a device for detecting traffic-related information in a driving motor vehicle with a connection to the system of a visual sensor for obtaining image data, a connection to a navigation system for obtaining map data and a connection to a display instrument for displaying or processing the results of the recognition. The device recommended according to aspects of the invention is in particular set up to implement the method stages described above.

For this purpose, the device comprises scene interpretation means for compacting the sensor or image data received from the (e.g. visual) sensor and the map data from the navigation system, and for forwarding the compacted sensor and map data to a computing unit with a regulator and a finite state machine. The scene interpretation means can, when image data is to be processed, be installations with image processing and recognition software in particular. In the case of map data from the navigation system, the scene interpretation means can in particular be filter means which filter the map data for the required, traffic-related information.

The regulator is set up according to aspects of the invention for the purpose of evaluating the compacted image and map data received from the scene interpretation and forwarding actions to be implemented to the finite state machine. The finite state machine according to aspects of the invention is set up for the purpose of conducting a transition on the basis of the action to be implemented in its state space with pre-defined states, and to issue the information assigned to the new state or to the transition to the display instrument via the connection. The display instrument can here be a visual display, an acoustic emission installation or a control device which directly intervenes in the motor vehicle functions an initiates a braking action, for example, when the motor vehicle is faster than is permitted by a specified maximum speed. It is also intended that a link be created to other driver assistance systems such as Cruise Control, Adaptive Cruise Control or Limiter.

According to a particularly preferred embodiment, a trigger control (trigger) for generating an overall trigger signal is connected downstream of the means for the first and second scene interpretation, which serves in particular as a start signal for the regulator, and the finite state machine is always implemented due to the monitoring of the periods of validity of traffic signs. If a sign appears to be no longer valid, the finite state machine can in turn trigger the regulator. The finite state machine can however be also triggered by a separate trigger signal from the regulator depending on the embodiment of the concept according to aspects of the invention.

According to an advantageous embodiment of the device according to aspects of the invention, the means for the first and second scene interpretation, the trigger and the computing unit can form a shared fusion module with the regulator and the finite state machine, in which the connections between the individual units are realised by particularly fast internal interfaces which are less prone to interference than external interfaces. Preferably, the entire fusion module can be designed as a device unit which comprises a computing unit with a storage device, integrator and external connections, and in which the method described above is implemented. Naturally, it is also possible to divide the fusion module into several separate devices, or also to enable the fusion module to run directly on the control device of the camera, in the control device of the navigation system or in the control devices of the display instrument.

In the fusion module, the means for the preliminary treatment of the image data can also be contained, so that the camera or visual sensor and if appropriate, other sensors, can be directly connected to the fusion module. This can also be achieved by tapping the corresponding information on a data bus. All data can then be treated in the fusion module according to aspects of the invention, the output interface of which is also preferably again connected to the data bus and makes available the traffic-related information in a standardised data format which can be evaluated by various other devices in the motor vehicle.

According to aspects of the invention, the modular structure of the recommended system (method and device) for recognising traffic-related information is of particular advantage when implementing installations of this type in a motor vehicle, since the division of the interpretation of the combined image and map data in a regulator and a finite state machine is simple and easy to handle. The interpretation specifications can be integrated into a transparent and easy to handle regulator which can easily be adapted to potential changes. The regulator contains the actual decision logic which is applied to the finite state machine with a comparatively low degree of complexity, in order that outputs are generated accordingly. Changes to the regulator can be easily administered with regard to the programme, and if necessary, can also be updated during the usual inspections. The use of finite state machines also provides a highly robust system with regard to the programme, which also offers a high degree of processing safety for safety-related applications, and which surprisingly, despite the static structure, can also be used to describe states of a driving motor vehicle in terms of detecting traffic-related information, in particular traffic signs and speed limits.

According to a further embodiment of the invention, the device for providing speed limit assistance to the motor vehicle is implemented (e.g. by a "Limiter").

According to a further embodiment of the invention, the device for determining the maximum speed currently permitted is implemented with parallel signals which can be detected by the sensor, wherein the detected signals correspond to related speed limits with different validities. The parallel signals can for example originate from several traffic signs.

In other words, the device is able, when multiple signs with different speed limits are present, to detect and select precisely that sign which is currently valid. To the extent that no information is available from the digital road map regarding the speed limits with their auxiliary symbols, with the aid of which the validity of the respective symbol is indicated, or when there is no opportunity to evaluate which validity condition has currently been meet, a configuration can be conducted by means of a parameter to determine whether the lower speed limit should be issued as a conservative interpretation, or whether the higher speed limit should be issued as a progressive interpretation. As a third alternative, both speed limits (insofar as they are present with the respective validity information) can be issued, so that the driver can decide which speed limit is currently valid.

According to a further embodiment of the invention, the device comprises a modular structure, so that individual components can be easily replaced.

Furthermore, the regulator can be designed as a software module, and is for example programmed in the programming language C or C++.

According to a further exemplary embodiment of the invention, a system for a motor vehicle is given which comprises a device described above and a sensor, a navigation system and a display instrument.

Furthermore, a motor vehicle with such a system is given.

According to a further exemplary embodiment of the invention, a programming element is given which when implemented on a processor triggers the processor to conduct the method stages described above.

According to a further embodiment of the invention, a medium is given which can be read by a computer, on which a programming element is stored which when implemented by a processor triggers the processor to conduct the method stages described above.

BRIEF DESCRIPTION OF THE DRAWINGS

Further features, advantages and potential applications of the present invention can be derived from the description off an exemplary embodiment and of the drawing below. Here, all the features described and/or illustrated constitute an object of the present invention, either in their own right or in any combination, and also independently of their compilation in the claims or their cross-references.

DETAILED DESCRIPTION OF THE PREFERRED EMBODIMENTS

In the following description of the figures, elements which are the same or similar are accorded the same reference numerals.

Figure 1:
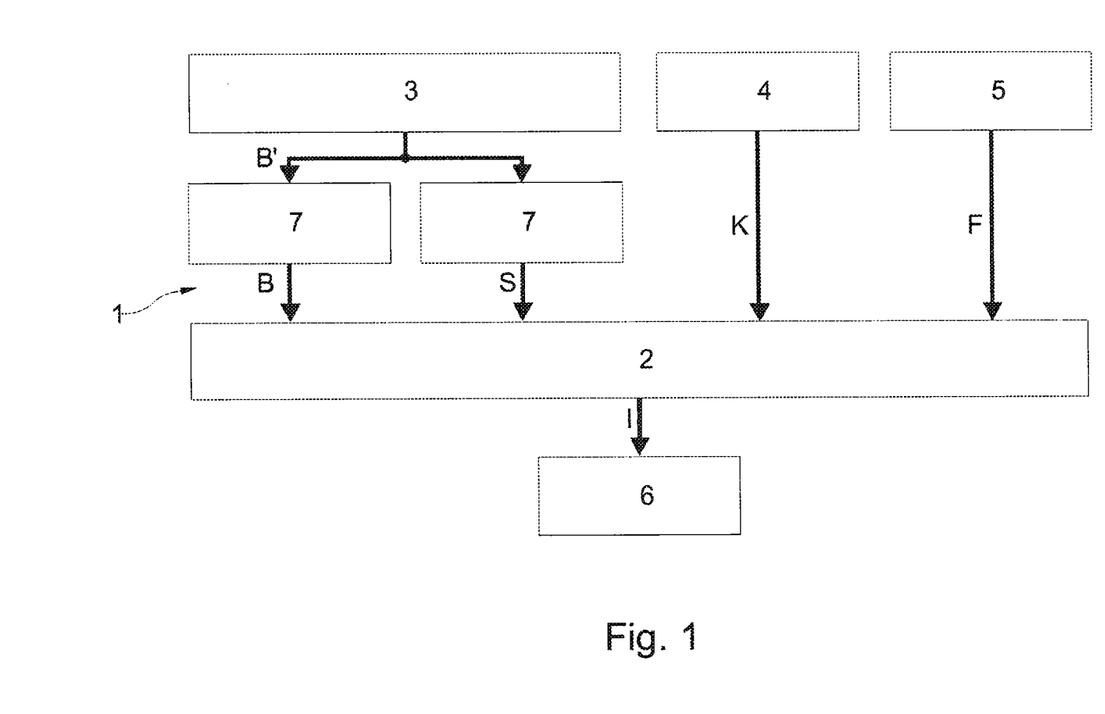
FIG. 1 shows a schematic view of the incorporation of a device for detecting traffic-related information according to aspects of the invention into a motor vehicle.

The device 1 for detecting traffic-related information, in particular traffic signs, shown in a schematic view in FIG. 1, comprises a "fusion module" 2 with connections to a visual sensor 3 which is designed as a camera, a navigation system 4 and the motor vehicle information system 5. Via the connections, image data B from the camera 3, map data K from the navigation system and the motor vehicle information system 5, which can for example be a CAN bus which is integrated in a motor vehicle, and motor vehicle data F is transmitted to the fusion module 2 which determines the required traffic-related information I from this data.

The traffic-related information I which is determined by the fusion module 2, such as the currently valid maximum speed, is issued to a display instrument 6 by the fusion module 2. The display instrument 6 can be a visual display which provides information to the driver. Furthermore, the display instrument can be a control interface to a motor vehicle control system which for example automatically influences the speed of the motor vehicle when it is determined that the motor vehicle speed exceeds the current maximum speed. In general, the display instrument can be any device which further processes the traffic-related information I which is determined according to aspects of the invention by the fusion module 2.

Before the image data B in the camera 3 is fed to the actual fusion module 2, a preliminary treatment process 7 is conducted in which the raw image data B' which originates directly from the camera 3 is inspected by an image detection algorithm for the pre-selection of information I which may be traffic-related, and is treated in a similar manner as the method for classic image processing with edge/circle detection and subsequent classification, and for example by deleting image areas which are not of interest. The treated images are then fed as actual image data B to the fusion module 2. The raw image data B' is also inspected in a parallel preliminary treatment process 7 according to the status information of the camera 3, and is fed as additional camera status data S to the fusion module 2.

The image data B and the camera status data S are the interim results of a first evaluation stage, to which the raw camera data B' of the camera 3 is subordinated. This pre-evaluation can be both integrated in the camera 3 or be implemented within the scope of the application according to aspects of the invention as a first method stage within the fusion module 2.

Figure 2:
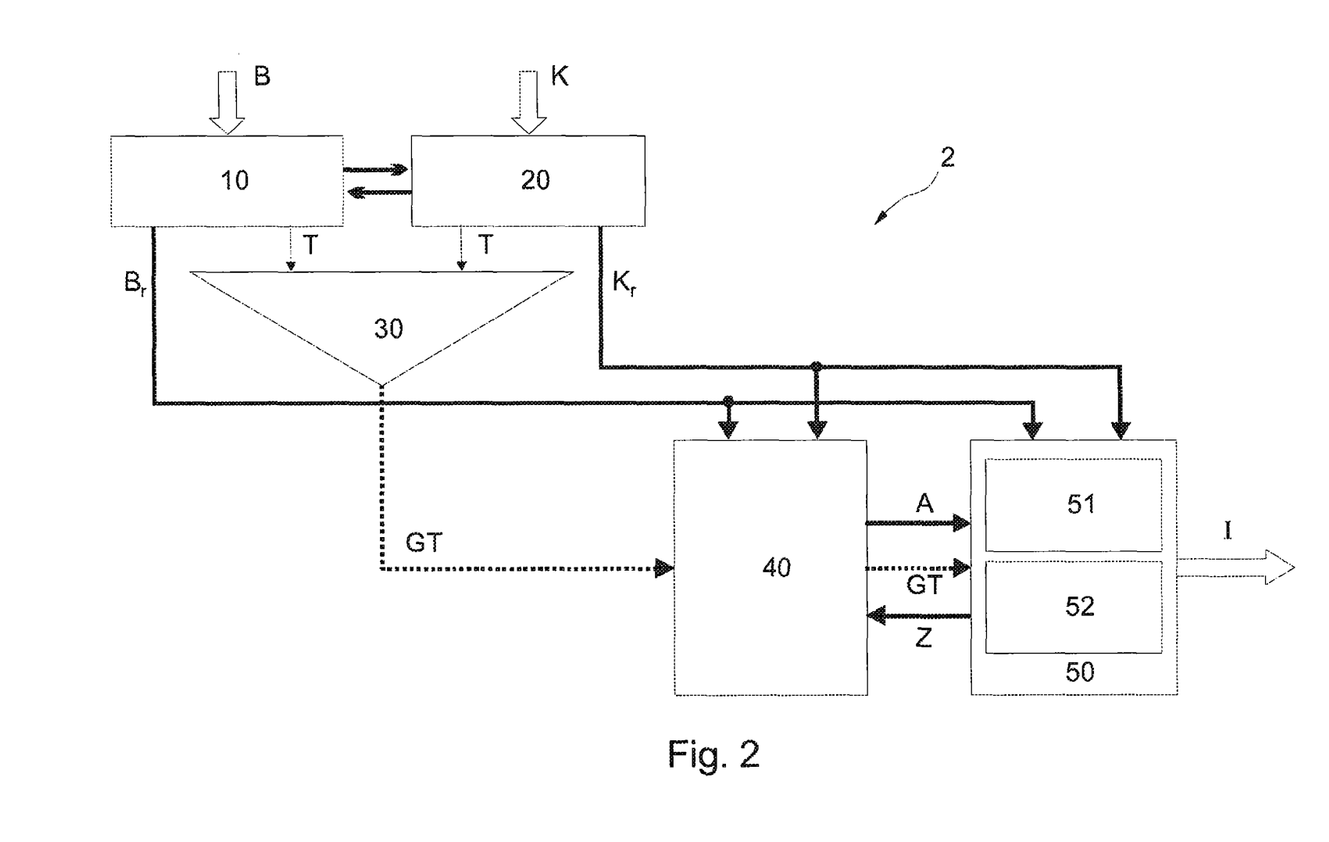
FIG. 2 shows the structure of the device according to aspects of the invention in detail

Before the actual functioning of the fusion module 2 is explained in greater detail with reference to FIG. 2, the technical field will here be described for greater clarity of understanding.

The aim of the present invention is to create an opportunity of recognising traffic-related information in a driving motor vehicle which makes this information available in a particularly reliable manner. For this purpose, different available raw data is used which in particular is supplied as image data B and camera data K by a visual sensor or a camera 3 and a navigation system 4 respectively.

As such, systems of this type are already known. However, if a camera-supported algorithm for example within the scope of the recommended preliminary treatment process 7 for recognising traffic signs or other relevant information and the digital road map of a navigation system 4 for recognising corresponding traffic signs in digital maps are regarded in their own right respectively, both systems contain significant disadvantages.

With camera-supported traffic sign recognition, traffic signs cannot reliably and correctly be recognised in all situations, depending on ambient light levels (light conditions). Additionally, there is lack of reliability with regard to damaged and partially covered traffic signs, wherein further error sources for an unreliable visual-optical capturing of traffic signs or similar traffic-related information are also possible.

The information from a digital road map contains several disadvantages. Thus, the information contained in the digital road map as map data K can be outdated. Furthermore, temporary speed rules such as for building sites and speed information given by temporary traffic signs, which are used to an increasing extent for intelligent traffic management, are not available in the digital data. From the digital road map, information regarding the topology of the respective road section being traveled (such as the area surrounding a road exit, the area surrounding a roundabout etc.) and the event of turning off a road (quitting the Most Probable Paths) is provided and processed in the fusion module.

The invention aims to combine the advantages of the two individual systems, so that reliable information I regarding the current permitted maximum speed or other traffic-related information can be provided. Here, the system according to aspects of the invention should be easy to integrated into a motor vehicle, and be further extendable at a later date. At the same time, rapid image processing must be conducted which enables the capture and evaluation of the traffic-related information I in real time.

A system of this type is created within the scope of the fusion module 2 according to aspects of the invention, which will be explained in greater detail below.

The fusion module 2 contains the map data K which is still present as raw data, and the image data B which has already been subjected to a preliminary treatment process 7, via one external interface respectively. In a preferred embodiment, the signals B are transmitted solely via one internal interface. Via further external interfaces, not shown, the camera status information or data S and the motor vehicle data F is furthermore supplied, wherein the external interfaces described above can also be formed fully or partially by a single motor vehicle data bus, such as a CAN bus. The information and data supplied, which is not shown in greater detail in FIG. 2, is here available to all units shown.

The image data B is fed to a first scene interpretation 10 and the map data K is fed to a second scene interpretation 20, which on the basis of pre-specified criteria select the decisive image and/or map data and compact it to relevant image data $B_r$ or map data $K_r$ respectively. The compacted data $B_r$ and $K_r$ and the camera status information S and motor vehicle data F which is made available if appropriate is preferably represented in the fusion module 2 as data vectors. The transmission is conducted via internal interfaces which enable particularly efficient data transmission. The external interfaces can serve as a direct connection to sensors within the motor vehicle, such as the camera 3. Furthermore, the map data K can be transmitted to the digital road map and/or motor vehicle data F via a CAN bus. The recognised traffic-related information I can also be issued to the display instrument 6 via a CAN bus.

The relevant image data $B_r$ and the relevant map data $K_r$ is fed to a regulator 40 and the finite state machine 50 from the scene interpretation means 10, 20. The regulator evaluates the image data $B_r$ and the map data $K_r$ and as a reaction to this evaluation, forwards an action A to be implemented to the finite state machine 50.

In the finite state machine 50, defined states Z are specified which represent the state of the driving motor vehicle and/or the direct motor vehicle environment. These states are preferably defined by essentially objectively measurable values, and differ from the information of the regulator 40 to the extent that on the basis of the measuring data, it conducts an interpretation of this measuring data in the sense of actions to be implemented. Due to this particularly advantageous division according to aspects of the invention between the determination of actions to be implemented in the regulator 40, which therefore conducts an interpretation which conforms to the road traffic rules of the map data and the image data, the finite state machine 50 ultimately describes the possible states of the motor vehicle and its surrounding environment. The different states Z which are defined in advance, must therefore reflect the entire reality.

Due to this simplified mapping, it is possible in particular to implement the fusion module 2 in driving motor vehicles in a simple manner and with a low degree of computing complexity to compact and issue the relevant information I from the selected data. In order to make a more comprehensive decision basis possible for the regulator, the finite state machine 50 reports the current state Z to the regulator 40 on the basis of the relevant image data $B_r$ and the relevant map data $K_r$.

The actions A to be implemented which are specified by the regulator 40 are realised within the finite state machine 50 by means of transitions between an initial state and a target state, wherein depending on the type of transition, the initial and the target state can be the same or different. When implementing a transition and/or achieving a new state, the required relevant information I is issued to the display instrument 6. The information can be issued permanently as status information. Alternatively, information for the driver can only be given when the speed limit is changed, or by means of a warning to the driver when the current permitted maximum speed is exceeded.

In order to prevent the regulator 40 and the finite state machine 50 from being constantly in operation, and delaying a large number of programming stages to be completed which leads to a data and processing jam, a trigger control device 30, also referred to in brief as a trigger, is provided which always receives a trigger signal T from the scene interpretations 10, 20 of the image data B or of the map data K when a scene interpretation 10, 20, recognises relevant information I in the data B, K supplied and has compacted this information into relevant image data B2 or relevant map data K2. On the basis of this trigger signal T, the trigger 30 generates an overall trigger signal GT, which is fed to the regulator 40 and finite state machine 50, and which initiates their computing operations.

The individual components of the fusion module 2 will now again be explained in detail below.

The image data B which has preferably already been pre-processed in the preliminary treatment process 7 is fed to a scene interpretation 10 for the image data B, the aim of which it is to obtain useful input data for the regulator 40, which will be described in greater detail below, and to compact the large amount of individual image data to the relevant information. For this purpose, the image data B, which is in most cases still present as pixel data, is converted into logical data information (relevant image data $B_r$) at the start of the scene interpretation 10, by translating information recognised in a camera image into relevant traffic information which is defined in the scene processing 10.

The image processing is conducted in the preliminary treatment process 7. The image data B is classified traffic signs with additional information such as storage, size, degree of reliability of the estimation and quality of the image processing.

Thus, the scene interpretation 10 is oriented for example to the recognition of certain traffic signs in order to determine the current valid maximum speed.

Alongside the interpretation of the individual images, it is necessary to place individual images from the camera 3 which succeed each other into a time sequence, since a traffic sign typically occurs in a plurality of individual images when photographs are taken from a driving motor vehicle. For this purpose, the traffic signs which detected asynchronously in terms of time are tracked internally in order to assign a recognised traffic sign in several images of the camera 3 to a traffic-related piece of information. If a traffic sign tracked in the scene interpretation 10 is no longer detected over a certain period of time, for example, it can be assumed that the motor vehicle has passed this traffic sign, and that now the traffic rules specified by this traffic sign apply. In this case, the time sequence (tracking) of these scenes is ended and the criteria for the "completion" of the scene have been fulfilled. The overall scene is then interpreted in the scene interpretation 10.

For example, the scene interpretation 10 can be oriented to selecting data on the current valid maximum speed. In this case, the interpretation in the completed scene means specifically that according to specified criteria, the speed limit signs or cancellation signs relevant to the own motor vehicle are selected, and irrelevant signs are rejected. With sign bridges which for example specify a separate speed for each lane on a motorway, irrelevant signs can be rejected by depositing the signs at the side, so that the relevant traffic information I can be compacted to the speed limit which applies to the own lane. If information is present from the digital road map that the motor vehicle is located in the area of a deceleration lane, signs can be assigned to this lane which are arranged only on the side of the lane. After completion of the scene interpretation, the logical data determined is made available as relevant image data $B_r$ to the regulator 40 and finite state machine 50 via an internal interface.

In a similar manner, it is the aim of the scene interpretation 20 to compact the map data K provided by the digital road map into relevant map data $K_r$. This can be generally compared to the scene compaction 10 described above for the camera-supported traffic sign recognition. For this purpose, current map information is combined with map information from a preview in order to compact the relevant traffic information which on completion of the scene interpretation is made available to the regulator 40 and the finite state machine 50 via a further internal interface.

The relevant data $B_r$ and $K_r$ which is made available is preferably transmitted in vectoral form, in which each vector entry is assigned to a previously defined piece of information.

Furthermore, the scene interpretations 10, 20 respectively generate a trigger signal T as soon as a scene interpretation 10, 20 determines a relevant change in the scene in comparison with a previous time stage with regard to the information to be inspected.

The trigger signals T are fed to a trigger 30, also referred to as trigger control device, which on the basis of these trigger signals T generates an overall trigger signal GT which is fed to the regulator 40 and preferably also to the finite state machine 50. When the overall trigger signal GT is received, the regulator 40 and the finite state machine 50 begin with the interpretation or evaluation of the relevant data $B_r$ and $K_r$ which has been made available, wherein the regulator 40 interprets this data according to rule information which has been specified and stored in a matrix, and the finite state machine 50 evaluates a current state of the motor vehicle and/or its surrounding environment from this data.

As a result, in the fusion module 2 which is preferably constructed as an integrator, computing time overall is saved since the regulator 40 and the finite state machine 50 only make use of computing time when an alteration has been made to the traffic-related information I. Until alterations of this type have been made, an increased computing capacity is by contrast available to the scene interpretations 10, 20 in order to compact the relevant data from the input data as quickly as possible.

In the simplest case, the trigger 30 can be realised by a disjunction of the two individual trigger signals T. In the embodiment shown, the overall trigger signal GT is however determined as follows. If the trigger signal T is present from a scene interpretation 10 or 20, a counter is activated which is designed for example as a distance counter and as a time counter, and continues to count for a certain distance on the basis of the current motor vehicle speed. This counter thus integrates the current motor vehicle speed. If the second trigger signal T from the other scene interpretation 20 or 10 is present prior to the expiry of a pre-defined maximum distance, the overall trigger signal GT is activated immediately. If no activation of the second trigger signal T occurs before the maximum distance of the distance counter has expired, the overall trigger signal GT is set to the maximum distance, for example, when the counter expires. This indicates that only one of the two scene interpretations 10, 20 has been able to identify traffic-related information.

With the aid of the control by means of the trigger 30, time asynchronicities can thus be captured which frequently occur due to the fact that traffic signs and their location are frequently not identical in the digital map information.

When the overall trigger signal GT is present, a regulator 40 is evaluated on the basis of the relevant data $B_r$ and $K_r$ from the scene interpretations 10, 20 which evaluates the information obtained in the relevant data $B_r$ and $K_r$ according to the valid traffic rules. These actions A to be implemented are converted in the finite state machine 50 into transitions with which a change is made in the finite state machine 50 from a first into a second state, which can also be identical to the first state. The regulator 40 can be designed in a country-specific manner in order to be able to take into account the different traffic rules in different countries. The structure recommended for the regulator 40 also makes it possible to flexibly implement changes in the traffic rules (for example due to changes in legislation).

With the aid of the finite state machine 50, various possible system states of the driving motor vehicle and/or of the motor vehicle environment are map. Here, the finite state machine 50 provides a main state machine 51 which determines the initial behaviour of the fusion module 2 and essentially specifies the information I to be issued. The main state machine 51 can for example essentially map the states assigned to the driving motor vehicle with regard to the current permitted maximum speed.

The mapping of specific ambient conditions such as a building site or route section with temporary traffic signs, is made possible by means of one or more environment state machines 52. The results of the recognition of traffic-related information I can thus be improved overall and accelerate the calculation of the information required. Depending on the actions A of the regulator 40 to be implemented, transitions are conducted between the states in the finite state machine 50 or main state machine 51 respectively and/or the environment state machine 52, wherein the issue of traffic-related information I can be coupled to the transition or the achievement of a new state. In both cases, information I is therefore issued which is assigned to the state.

The motor vehicle data F which in particular also comprises the current speed of the motor vehicle via telematic systems or via information of other motor vehicles or landmarks in the surrounding environment of the motor vehicle which is received via an interface of a camera system or navigation system, is included as additional information in the evaluation in the fusion module 2, and can preferably also be present in vector form. Limitation types are thus made adaptable and can be designed as restricting, non-restricting or changeable.

Figure 3:
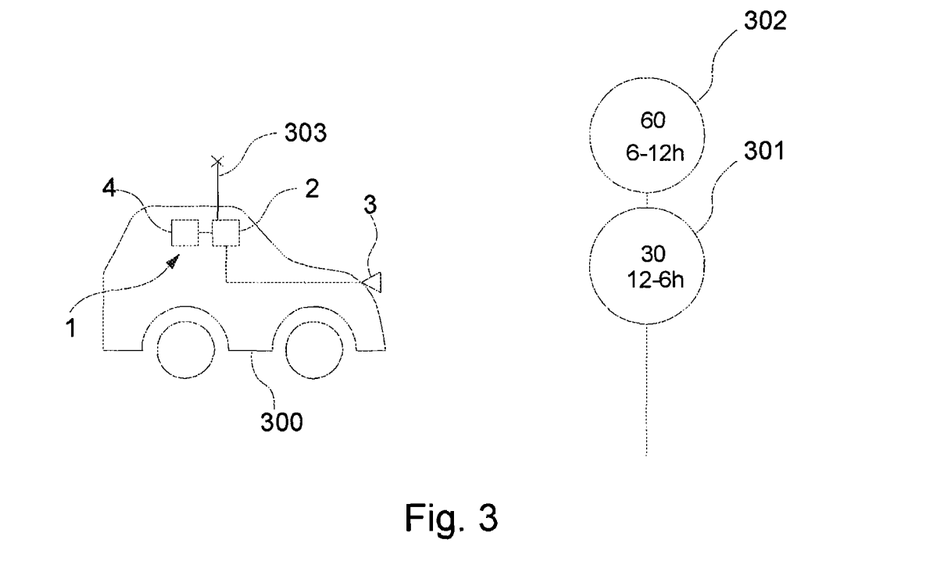
FIG. 3 shows a schematic view of a motor vehicle with a system according to an exemplary embodiment of the present invention

FIG. 3 shows a schematic view of a motor vehicle with a system for recognising traffic-related information according to an exemplary embodiment of the invention. On the front section of the motor vehicle 300, a visual sensor 3 is attached which is connected to the fusion module 2 via a data line. Furthermore, a navigation system 4 is provided. Corresponding satellite signals can be received via the antenna 303. The remaining components of the system are not shown for improved clarification.

A double sign 301, 302 is located in front of the motor vehicle. The sign 301 shows a speed limit of 30 kilometres per hour between 12 pm and 6 am. By contrast, the sign 302 shows a speed limit of 60 kilometres per hour between 6 am and 12 pm.

The system is naturally able to select the currently valid sign and if necessary actively limit the speed of the motor vehicle or simply display the current speed limit.

The selection can also be made when the corresponding restrictions are present together with the additional signs or validity information in the map. In this case, no recognition of the additional signs with the aid of the camera is required.

Figure 4:
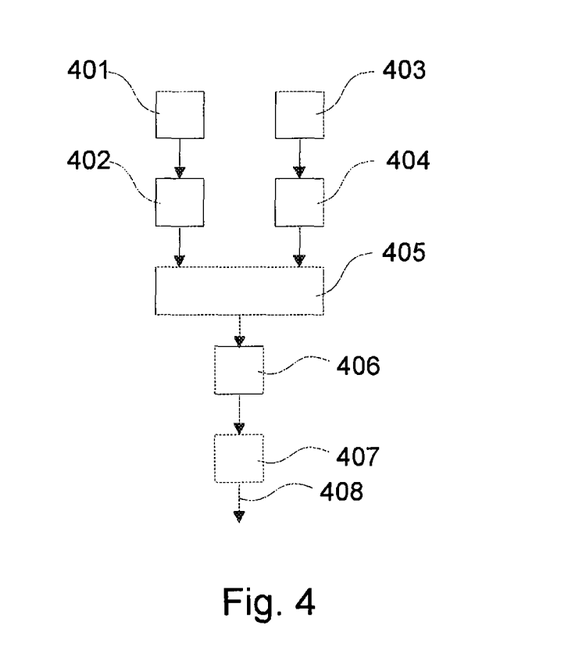
FIG. 4 shows a flow chart of a method according to an exemplary embodiment of the present invention The illustrations in the figures are schematic and not to scale.

FIG. 4 shows a flow chart of a method according to an exemplary embodiment of the invention. In stage 401, the image data is detected by a camera. In stage 402, this image data is subjected to a first scene interpretation in order to inspect the data for relevant traffic information and to compact it accordingly. In parallel or at a different point in time, map data is loaded in stage 403 and is inspected for traffic-related information present and compacted in stage 404 in a second scene interpretation.

The corresponding results are then fed to a regulator in stage 405 which evaluates the image data and the map data. A corresponding output signal is then transmitted from the regulator to a finite state machine (stage 406). The finite state machine conducts a transition in its state space in stage 407, which is based on the output signal of the regulator.

The finite state machine then issues corresponding information (408).

This information can be used to display a speed limit, for example. This information can also be used to control the motor vehicle assistance system.

Two further exemplary embodiments of the invention will now be described below.

The first exemplary embodiment relates to the implementation of the regulator of the fusion module. The second exemplary embodiment relates to a method for treating parallel speed limits in the fusion module in order to use the current valid maximum speed.

The First Exemplary Embodiment

In the fusion module, information from a digital road map and information from camera-supported traffic sign recognition is combined in order to inform the driver regarding the permitted maximum speed. Furthermore, the current valid speed limit can be used as an initial value for the speed rule installation. Applications from the autonomous driving field are also possible.

In order to be able to issue a clear result in cases of contradictory situations from the input data, the fusion module contains a regulator. On the basis of pre-treated input data from the two information sources (visual sensors and digital map), a decision is made. For this purpose, the regulator is used (see FIG. 2).

Basic functioning: When a traffic sign or a change to a signal from the digital road map is detected, the regulator is evaluated based on the initial data of the data compaction or scene interpretation. The starting point for this regulator are the actions to be implemented which are mapped in the respective finite state machines for transitions. Both the pre-treatment blocks and the regulator can be designed in a country-specific manner in order to be able to take into account special features from different countries. In order to describe the regulator, a special structure is used in the form of two matrices, the contents of which are interpreted by an algorithm.

Implementation of the regulator: Input and output signals are compiled in a vector respectively. The regulator is described in the form of a matrix. Each line of this matrix represents a rule. In a second matrix, output values which belong to each rule are stored in lines. When the regulator is implemented (triggered by the trigger signal GT in FIG. 2), an algorithm is implemented which checks line for line whether a rule has been fulfilled. If this is the case, the evaluation is stopped. The output signals are filled with the output values belonging to the rule which has been evaluated as being true. The corresponding function is converted in the programming language C, for example as a software module.

The number of input signals is flexible and can be specified with the aid of a parameter (such as 25 input signals). The input signals, for example, are referred to as in1, in2, in3 etc.

The number of output signals is also variable, and can be specified with the aid of a parameter (such as five output signals). The output signals are for example referred to as ou1, ou2, ou3 etc.

The number of rules is also variable and can be specified with the aid of a parameter (such as 200 rules). A rule consists of "sub-rules" (such as ten "sub-rules"). Examples of "sub-rules" are:

IF(in*l*<in2)

IF(in1==const)

IF(in1−in5±const)

Each "sub-rule" consists of five components (columns in the rule matrix):
Component 1: Input signal #1
Component 2: Operator #1
Component 3: Input signal #2
Component 4: Operator #2
Component 5: Constant Individual components from a rule can be "empty", which generally corresponds to the filling with value "0". All "sub-rules" are linked with a logical AND. As soon as a rule is evaluated as TRUE when the regulator is run through, the output values contained for the respective rule in the output matrix are assigned to the output signals.

Different operations of the regulator with their corresponding meaning are now shown below:
==: the same as
!=: not the same as
>: greater than
<: less than
>=: greater than or equal to
<=: less than or equal to
+: addition
−: subtraction
Maintenance of the Regulator:

The regulator can be set up and maintained using a tool. For example, a table processing programme can be used for this purpose, from which both rules and output matrices can be exported by means of a macro (based for example on the Visual Basic programming language). With the aid of an algorithm, a check is made during the run time as to whether the rule and output matrix are valid.

A complex tool which also provides a graphic interface for developing and maintaining the regulator can also be used.

The following table 1 shows an example of a rule matrix.

| Sub-rule 1 | | | | | sub-rule 2 | | | | | s-r 3 | Rule# |
|---|---|---|---|---|---|---|---|---|---|---|---|
| in1 | Op | in2 | op | const | in1 | op | in3 | op | const | ... | R1 |
| in1 | Op | 0 | 0 | const | in4 | op | in5 | 0 | 0 | 0 | R2 |

-continued

| Sub-rule 1 | | | | | sub-rule 2 | | | | | s-r 3 | Rule# |
|---|---|---|---|---|---|---|---|---|---|---|---|
| 1 | 4 | 2 | 0 | 0 | 1 | 8 | 5 | 6 | 27 | 0 | R3 |
| ... | ... | ... | ... | ... | ... | ... | ... | ... | ... | ... | ... |

TABLE 1

| Sub-rule 1 | | | | | sub-rule 2 | | | | | s-r 3 | Rule# |
|---|---|---|---|---|---|---|---|---|---|---|---|
| in1 | Op | in2 | op | const | in1 | op | in3 | op | const | ... | R1 |
| in1 | Op | 0 | 0 | const | in4 | op | in5 | 0 | 0 | 0 | R2 |
| 1 | 4 | 2 | 0 | 0 | 1 | 8 | 5 | 6 | 27 | 0 | R3 |
| ... | ... | ... | ... | ... | ... | ... | ... | ... | ... | ... | ... |

Here, rule 3 corresponds to the query $$((in1<in2)\&\&(in1-in5)\leq 27))$$

The following table 2 shows an example of the output matrix:

TABLE 2

| rule# | ou1 | ou2 | ou3 | ou4 | ou5 |
|---|---|---|---|---|---|
| R1 | 1 | 3 | 0 | 0 | 0 |
| R2 | 2 | 4 | 3 | 3 | 3 |
| R3 | 3 | 3 | 7 | 1 | 2 |
| ... | ... | ... | ... | ... | ... |
| default | 0 | 0 | 0 | 0 | 0 |

The regulator described above is used for implementing the decision logic for the fusion module. Due to the structure of the fusion module and the modular structure of the overall system, clear units result which can be extended in as complete a manner as required. For this purpose, a transparent, easy to adapt regulator was selected. In this manner, a simple adaptation to different country variants or in the future newly added input signals can be made possible. Since the actual decision logic is stored in the form of the regulator, only finite state machines with a low level of complexity are required.

Description of the Second Exemplary Embodiment

Basic functioning: On numerous road sections, such as on motorways or national roads with a similar structure to a motorway, speed limits which have been positioned in parallel (referred to below as multiple signs) are to be found. To the extent that these are clearly recognised as such, the limits which deviate from each other can be processed internally. Thus for example a parallel sign "120 without restriction" and "80 in wet conditions" could occur as a multiple sign. In most cases, these signs are attached to a post one on top of the other. Speed limits with traffic lane-related validity are not regarded as being multiple signs as is the case with a group of signs, for example. If when two speed limits with different values are detected, it cannot be clearly assumed that multiple signs are present, the fusion module makes a clear decision for a limit.
The Recognition of Multiple Signs:

Multiple signs can be recognised both on the basis of the data which is supplied by the algorithm for detecting and classifying traffic signs, as well as the information contained in the digital road map. If with the former input data no additional symbol has yet been detected and classified, recognition of multiple signs is only possible by means of the position of the signs in relation to each other. This occurs within the scope of the "scene interpretation" of the input data from the camera. Conversely, it can be assumed to a high degree of probability that when two signs are positioned directly one on top of the other, they will in most cases be multiple signs. If multiple signs are stored in the digital road map, the type of restriction (such as during a trade fair, at specific times, on specific days, for specific vehicle types such as lorries) is also known.

On the basis of these embodiments, it is clear that for the fusion module, the input data is not essentially different for single and multiple signs. In addition to the pure speed limits, corresponding information is forwarded to the regulator and finite state machines when multiple signs are recognised by means of the image processing. With multiple signs or with single signs with restricted validity, the information regarding the type of restriction is transmitted.

The speed limits with restricted validity are processed as follows: To the extent that it is known from the digital road map that a speed limit is has restricted validity, this additional information can be assigned to one of the symbols detected by the image processing. The driver can thus be informed regarding the type of restriction. Speed limits which are not valid for a certain motor vehicle type, for example (such as speed limits for lorries) or which are not currently valid, can be suppressed in this manner. To the extent that information regarding the validity of a speed limit can be supplied by the image processing module, an assignment is made directly.

Multiple signs are processed as follows: The regulator described is evaluated several times with multiple signs from the digital road map or from the algorithms for detecting and classifying traffic signs in the camera image. Here, different input data is specified by a logic unit in each case. The result of each regulator evaluation is fed to the parallel finite state machine used for mapping multiple signs. Here, a finite state machine is used for each speed limit to be mapped. In this manner, it is possible to use clear and maintainable regulators. A further option is to refrain from using the logic unit for specifying the input data for a serial regulator evaluation, and to use a comprehensive regulator which triggers the parallel finite state machines.

A comprehensive regulator can be used as a further embodiment, with which all speed limits can be processed in one single regulator run. However, this has the disadvantage that the regulator is correspondingly comprehensive and difficult to maintain due to the additional inputs.

As has been described above, either all speed limits can be transferred to the driver with validity information when appropriate, or only those restrictions which are of relevance to the driver. Furthermore, it is possible to make a selection regarding the restrictions to be displayed, and only to show the restriction with the highest and lowest value, for example.

The fusion module for fusing the data from camera-supported traffic sign recognition and a digital road map for a driver assistance system for determining the current valid permitted maximum speed can process speed limits with different validities which exist in parallel.

Due to the structure described, a clear and easily maintainable system results. Multiple signs can be processed and depending on the customer's requirements or the strategy being pursued with regard to the human-machine interface, can be displayed as information for the driver.

The system can be used flexibly and is easy to maintain. In order to keep the regulator small, several finite state machines can be provided which can be used in parallel. In this case, the regulator can be arranged several times in succession, each time with different input vectors (input data).

The invention also makes it possible to unite the advantages of the two individual systems, "camera-supported traffic sign recognition" sand "digital road map". Due to the fusion module 2 or the method which is conducted in it, it is possible to provide the driver with information regarding traffic-related information and in particular, the current permitted maximum speed, even with unfavourable ambient conditions, and even when only temporary speed restrictions or information shown by temporary signs are present.

In addition, it should be noted that "comprehensive" and "comprising" does not exclude other elements or stages, and that "one" does not exclude a plurality. Furthermore, it should be noted that features or stages which are described with reference to one of the above exemplary embodiments can also be used in combination with other measures or stages of other exemplary embodiments described above.

The invention claimed is:

1. A method for recognizing traffic-related information (I) in a driving motor vehicle, in which sensor data (B) from a sensor and map data (K) from a navigation system are interpreted for recognition purposes, said method comprising the steps of:
    inspecting the sensor data in a first scene interpretation for the presence of traffic-related information (I);
    compacting the sensor data in the first scene interpretation to relevant sensor data ($B_r$);
    inspecting the map data (K) in a second scene interpretation for the presence of traffic-related information (I);
    compacting the map data (K) in the second scene interpretation to relevant map data ($K_r$); and
    feeding the relevant sensor data ($B_r$) and the relevant map data ($K_r$) to a regulator for interpreting the sensor and map data,
    wherein the regulator evaluates the sensor data ($B_r$) and the map data ($K_r$) and then issues an output signal which corresponds to the evaluation,
    wherein the output signal corresponds to an action to be implemented (A),
    wherein the regulator forwards the output signal to a finite state machine, and
    wherein the finite state machine conducts a transition in a state space with pre-defined states (Z), and issues information (I) which is assigned to either a state (Z) or the transition.

2. A method according to claim 1,
    wherein the sensor is a visual sensor, and wherein the sensor data is image data.

3. A method according to claim 1,
    wherein, in the regulator, an interpretation of the relevant image and map data ($B_r$, $K_r$) is conducted on the basis of specific sets of rules, and the action (A) specified by the regulator parameterizes a behavior to be observed on the basis of a recognized rule.

4. A method according to claim 1,
    wherein in order to map the regulator, a matrix is used which can be evaluated by an algorithm.

5. A method according to claim 1,
    wherein the finite state machine comprises defined states (Z) in which the motor vehicle can find itself, wherein an action to be implemented (A) of the regulator effects a transition in the finite state machine of a defined state (Z) to another defined state (Z), or to the finite state machine.

6. A method according to claim 1,
    wherein a transition is connected in the finite state machine with an issue of information.

7. A method according to claim 1,
    wherein the finite state machine reports back its state (Z) to the regulator.

8. A method according to claim 1,
wherein the finite state machine is divided into a main state machine and one or more environment state machines.

9. A method according to claim 1,
wherein the first scene interpretation and the second scene interpretation transmit a trigger signal (T) to a trigger control device during the compaction to relevant image or map data ($B_r$, $K_r$), which generates an overall trigger signal (GT) for the regulator and the finite state machine.

10. A method according to claim 9, wherein the trigger control device comprises a disjunction of two trigger signals (T) from the first and second scene interpretation in order to generate the overall trigger signal (GT).

11. A method according to claim 10, wherein the disjunction is a delayed disjunction.

12. A method according to claim 10, wherein the trigger control device activates a counter when a first trigger signal (T) from the first scene interpretation or the second scene interpretation is present, and generates the overall trigger signal (GT) either when a maximum counter value is reached, or when the second trigger signal (T) is present.

13. A method according to claim 1, wherein in the first scene interpretation and/or the second scene interpretation, relevant image and/or map data ($B_r$, $K_r$) is selected on a basis of pre-specified criteria.

14. A method according to claim 2, wherein image data (B') of the visual sensor is reduced in a preliminary treatment process prior to the first scene interpretation to a pre-selection of image data (B) and camera status data (S) to be inspected.

15. A method according to claim 1, wherein the first scene interpretation and the second scene interpretation exchange information.

16. A method according to claim 1, wherein motor vehicle data (F) and/or camera status data (S) is available when recognizing traffic-related information (I).

17. A method for recognizing traffic-related information (I) in a driving motor vehicle with a connection to a system of a sensor for obtaining sensor data (B, B'), a connection to a navigation system for obtaining map data (K) and a connection to a display instrument for displaying or processing the results of the recognition, which is set up in order to implement the method according to claim 1,
further comprising means for scene interpretation for compacting the sensor data (B) received from the sensor and the map data (K) from the navigation system and for forwarding the compacted sensor and map data ($B_r$, $K_r$) to a computing unit with a regulator;
wherein the regulator is set up in order to evaluate the compacted sensor and map data ($B_r$, $K_r$) and to issue a corresponding output signal.

18. A device according to claim 17,
wherein the computing unit furthermore comprises a finite state machine;
wherein the output signal corresponds to an action to be implemented (A);
wherein the regulator is designed for forwarding the output signal to the finite state machine, and
wherein the finite state machine is set up, due to the action to be implemented (A), to conduct a transition in a state space with pre-defined states (Z), or to issue information (I) which is assigned to the transition to the display instrument via the connection.

19. A device according to claim 17,
wherein the sensor is a visual sensor and wherein the sensor data is image data.

20. A device according to claim 17,
wherein a trigger control device for generating an overall trigger signal (GT) is connected subsequently to the means for the first scene interpretation and the second scene interpretation.

21. A device according to claim 20,
wherein the means for the first scene interpretation and the second scene interpretation, the trigger control device and the computing unit with the regulator and finite state machine form a shared fusion module.

22. A device according to claim 20,
wherein the device provides speed limitation assistance.

23. A device according to claim 17 designed for determining a current permitted maximum speed with parallel signals which can be detected by the sensor, which correspond to speed limitations with different validities.

24. A device according to claim 17,
wherein the device comprises a modular structure.

25. A device according to claim 17,
wherein the regulator is designed as a software module with two matrices.

26. A system for a motor vehicle, comprising:
a device according to claim 17;
a sensor;
a navigation system; and
a display instrument.

27. A motor vehicle with a system according to claim 26.

28. A program element which, when implemented on a processor, instructs the processor to implement the method according to claim 1.

29. A medium which can be read by a computer on which a program element is stored, which, when implemented on a processor, instructs the processor to implement the method according to claim 1.

* * * * *

UNITED STATES PATENT AND TRADEMARK OFFICE
CERTIFICATE OF CORRECTION

PATENT NO.       : 8,452,524 B2                                                   Page 1 of 1
APPLICATION NO.  : 12/601416
DATED            : May 28, 2013
INVENTOR(S)      : Groitzsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this
Eighth Day of September, 2015

Michelle K. Lee
*Director of the United States Patent and Trademark Office*